US008224361B2

(12) United States Patent
Timmons et al.

(10) Patent No.: US 8,224,361 B2
(45) Date of Patent: Jul. 17, 2012

(54) SYSTEM AND METHOD FOR ENHANCED MESSAGE ROUTING

(75) Inventors: Michael Timmons, San Jose, CA (US);
Todd Matthew Kokoszka, Alexandria, VA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 1036 days.

(21) Appl. No.: 12/140,478

(22) Filed: Jun. 17, 2008

(65) Prior Publication Data

US 2008/0318600 A1     Dec. 25, 2008

Related U.S. Application Data

(60) Provisional application No. 60/945,174, filed on Jun. 20, 2007.

(51) Int. Cl.
*H04W 4/00* (2009.01)
(52) U.S. Cl. ........ 455/466; 455/445; 370/312; 370/313; 370/432
(58) Field of Classification Search .................. 455/466, 455/445; 370/312, 313, 432
See application file for complete search history.

(56) References Cited

U.S. PATENT DOCUMENTS

| 2003/0079040 A1 | 4/2003 | Jain et al. |
| 2004/0156495 A1 | 8/2004 | Chava et al. |

*Primary Examiner* — Temica M Beamer
(74) *Attorney, Agent, or Firm* — Edell, Shapiro & Finnan, LLC (57) ABSTRACT

Coincident with the evolution, maturation, etc. of (e.g., Short Message Service, Multimedia Message Service, IP Multimedia Subsystem, etc.) wireless messaging ecosystems an infrastructure that provides, in new and creative ways, enhanced message routing capabilities. The dynamic, flexible, and extensible nature of the enhanced message routing capabilities support, among other things, very large volumes of messaging traffic, numerous billing paradigms, different Quality of Service levels and possible charges for same, improved troubleshooting and problem investigation capabilities, etc. The infrastructure may optionally leverage the capabilities of a centrally-located Messaging Inter-Carrier Vendor.

35 Claims, 6 Drawing Sheets

SYSTEM AND METHOD FOR ENHANCED MESSAGE ROUTING

This application claims the benefit of U.S. Provisional Patent Application No. 60/945,174, filed on Jun. 20, 2007, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS), Internet Protocol (IP) Multimedia Subsystem (IMS), etc.

2. Background of the Invention

As the 'wireless revolution' continues to march forward the importance to a Mobile Subscriber (MS)—for example a user of a Wireless Device (WD) such as a mobile telephone, a BlackBerry, etc. that is serviced by a Wireless Carrier (WC)—of their WD grows substantially.

One consequence of the growing importance of WDs is the resulting ubiquitous nature of WDs—i.e., MSs carry them at almost all times and use them for an ever-increasing range of activities.

Over the past many years that ubiquitousness has driven a steady annual increase, year over year, in the number of (SMS, MMS, etc.) messages that have been exchanged by and between WDs. That steady increase shows no sign of abating. For example, as reported by the industry group CTIA (see the world wide web site ctia.org) in the U.S. there were over 158 billion SMS messages sent during 2006 (representing a 95% increase over 2005) and there were over 2.7 billion MMS messages sent during 2006 (representing a 100% increase over 2005).

As the volume of messaging has increased in the past, and at present continues to increase, it has become more and more important for all of the different entities that process messages—e.g., WCs, intermediaries, enterprises, Content Providers (CPs), Service Providers (SPs), etc.—to route messages in the most flexible and efficient manner possible.

In the past the routing of a message was fairly rigid and may have consisted of examining just the destination address (e.g., the destination Telephone Number [TN]) of the message. Today and in the future the routing of a message needs to operate in as optimal a fashion as possible, needs to be much more flexible, and needs to take into account many more elements (beyond just, for example, a destination TN)—all to support, possibly inter alia, very large volumes of messaging, numerous billing paradigms, different Quality of Service [QoS] levels and possible charges for same, improved troubleshooting and problem investigation capabilities, etc.

The challenges that were described above highlight the need for an innovative infrastructure that offers, as part of the natural evolution, maturation, etc. of a wireless messaging ecosystem, enhanced message routing capabilities.

The present invention provides such an infrastructure and addresses various of the (not insubstantial) challenges that are associated with same.

SUMMARY OF THE INVENTION

In one embodiment of the present invention there is provided a method for routing a wireless message, including receiving at a gateway an incoming message, said incoming message containing at least a destination address and having been originally initiated as a wireless message including said destination address, performing one or more processing steps on said incoming message including at least: (a) resolving said destination address yielding a resolved destination address; and (b) generating a tag, said tag containing at least a digest value, said digest value based on at least one or more of aspects of said destination address and aspects of said resolved destination address, querying a local cache for the presence of said digest value, said local cache preserving for a digest value at least a route selection, generating an outgoing message, said outgoing message being based on at least said route selection and aspects of said incoming message, and dispatching said outgoing message.

In the embodiment said wireless message or outgoing message is one of (a) a Short Message Service message, (b) a Multimedia Message Service message, or (c) an IP Multimedia Subsystem message, and said destination address is one of (a) a telephone number, (b) a short code, (c) a SIP address, or (d) an e-mail address.

Further, resolving said destination address includes accessing one or more of (a) a composite routing database and (b) a real-time query facility.

The tag may contain one or more of (a) a type indicator, (b) a version number, (c) a digest value, and (d) a qualifier.

Still in accordance with the embodiment, the method includes preserving aspects of the addressing of said incoming message as preserved address elements. These preserved address elements may include one or both of (a) source address information and (b) destination address information, and may further include one or more of (a) an Internet Protocol address, (b) a Transmission Control Protocol port number, and (c) a User Datagram Protocol port number when said incoming message is received through an Internet Protocol-based communication paradigm.

The preserved address elements may still further include one or more of (a) a point code and (b) a subsystem number when said incoming message is received through a Signaling System Number 7-based communication paradigm.

These and other features of the embodiments of the present invention, along with their attendant advantages, will be more fully appreciated upon a reading of the following detailed description in conjunction with the associated drawings.

It should be understood that these figures depict embodiments of the invention. Variations of these embodiments will be apparent to persons skilled in the relevant art(s) based on the teachings contained herein.

DETAILED DESCRIPTION

Aspects of the present invention may be offered as a value-add service by a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same. The disclosure of U.S. Pat. No. 7,154,901, along with its associated continuations, is incorporated herein by reference.

Figure 1:
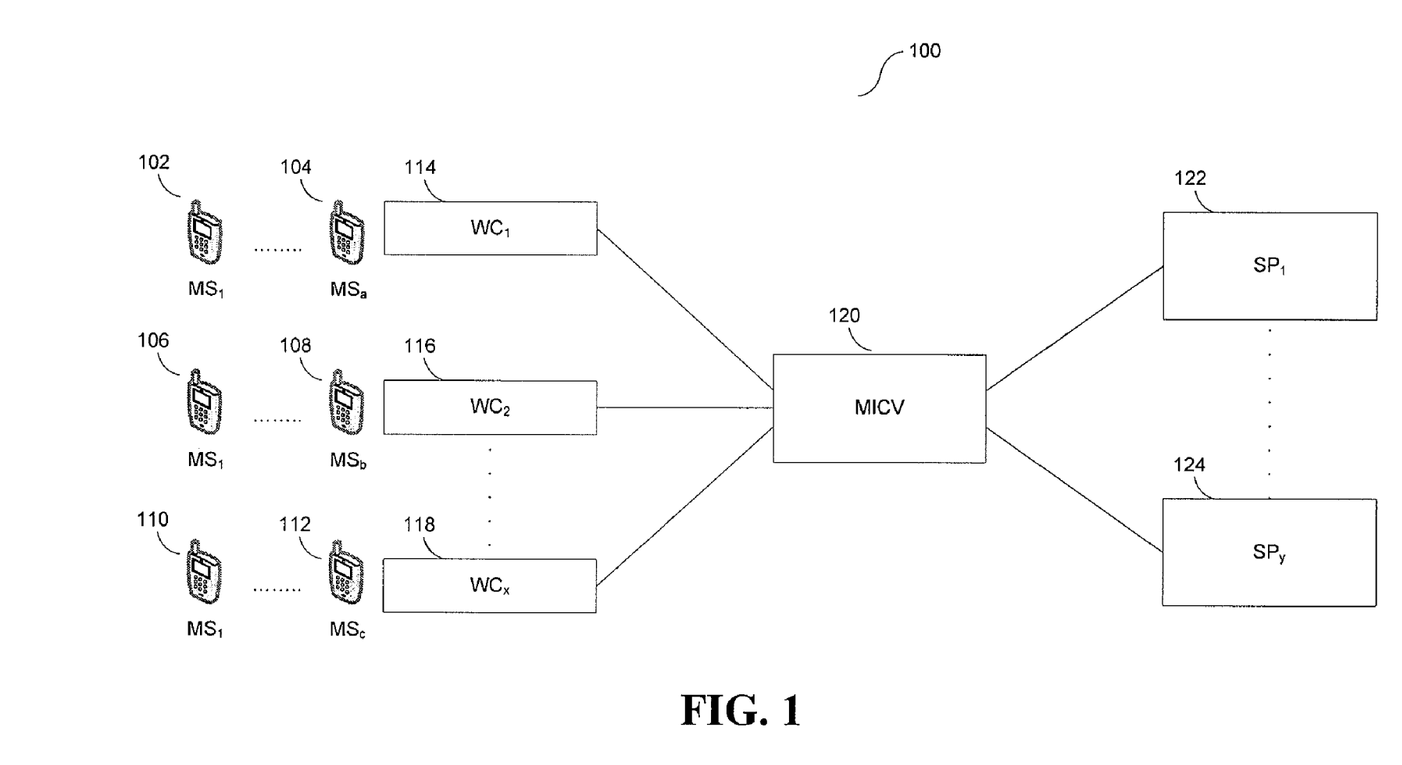
FIG. 1 is a diagrammatic presentation of an exemplary Messaging Inter-Carrier Vendor (MICV).

As illustrated in FIG. 1 and reference numeral 100 a MICV 120 is disposed between, possibly inter alia, multiple WCs ($WC_1$ 114→$WC_x$ 118) on one side and multiple SPs ($SP_1$ 122→$SP_y$ 124) on the other side and thus 'bridges' all of the connected entities. A MICV 120 thus, as one simple example, may offer various routing, formatting, delivery, value-add, etc. capabilities that provide, possibly inter alia:

1) A WC ($WC_1$ 114→$WC_x$ 118 and, by extension, all of the MSs 102→104, 106→108, 110→112 that are serviced by the WC $WC_1$ 114→$WC_x$ 118) with ubiquitous access to a broad universe of SPs $SP_1$ 122→$SP_y$ 124, and 2) A SP $SP_1$ 122→$SP_y$ 124 with ubiquitous access to a broad universe of WCs ($WC_1$ 114→$WC_x$ 118 and, by extension, to all of the MSs 102→104, 106→108, 110→112 that are serviced by the WCs $WC_1$ 114→$WC_x$ 118).

Generally speaking a MICV may have varying degrees of visibility (e.g., access, etc.) to the (MS⇆MS, MS⇆SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While aspects of the present invention may be offered by a MICV, it will be readily apparent to one of ordinary skill in the relevant art that numerous other arrangements are equally applicable (e.g., aspects of the present invention may be offered by a third-party service bureau, by an element of a WC or a landline carrier, by an enterprise, by a SP or by a CP, by multiple third-party entities working together, etc.) and indeed are fully within the scope of the present invention.

Figure 2:
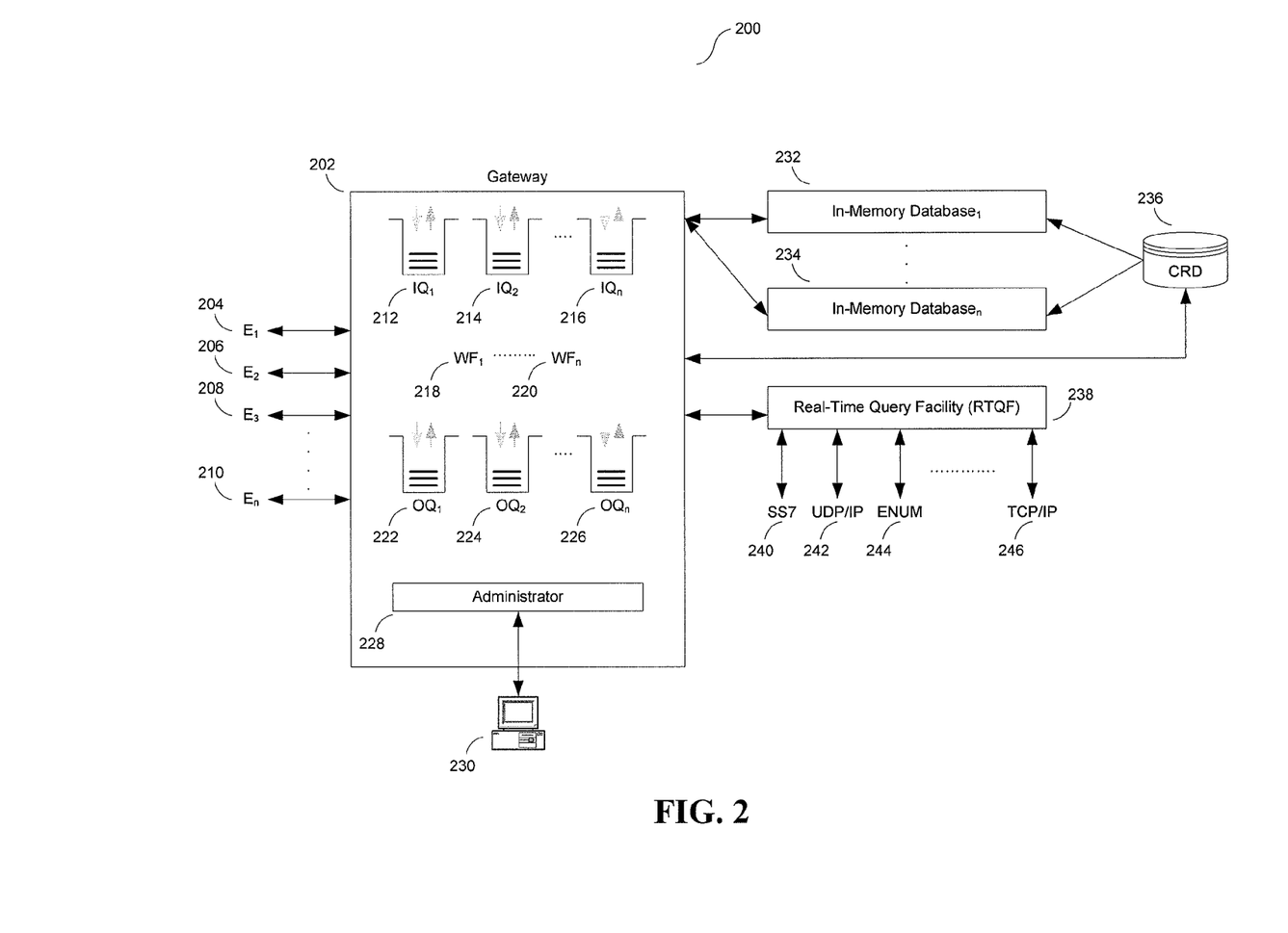
FIG. 2 is a diagrammatic presentation of an exemplary Message Processing Infrastructure (MPI).

To help illustrate aspects of the present invention consider the simplified MPI that is presented in FIG. 2 and reference numeral 200. A MPI may exist within any or all entities such as, possibly inter alia, a MICV, a WC, an enterprise, a SP or a CP, etc. In brief a MPI may interact with Entities ($E_1$ 204, $E_2$ 206, ... $E_n$ 210), such as possibly inter alia a MICV or a WC or an enterprise or a CP or a SP or a etc., to:

1) Receive incoming SMS, MMS, etc. messages over any combination of one or more communication paradigms or channels (including, possibly inter alia, IP, SS7, etc.).

2) Process and route the messages (more about this below).

3) Send outgoing SMS, MMS, etc. messages over any combination of one or more communication paradigms or channels (including, possibly inter alia, IP, SS7, etc.)

Of interest and note in FIG. 2 are:

1) A Gateway 202. Behind the facade of a single consolidated Gateway 202 a dynamically updateable set of one or more software processes (not explicitly depicted in the diagram) handle incoming traffic and outgoing traffic. Incoming traffic is accepted and deposited on an intermediate or temporary Incoming Queue ($IQ_1$ 212→$IQ_n$ 216 in the diagram) for subsequent processing. Processed artifacts are removed from an intermediate or temporary Outgoing Queue ($OQ_1$ 222→$OQ_n$ 226 in the diagram) and then dispatched.

2) Incoming Queues ($IQ_1$ 212→$IQ_n$ 216). A dynamically updateable set of one or more IQs ($IQ_1$ 212→$IQ_n$ 216) operate as intermediate or temporary buffers for incoming traffic.

3) WorkFlows ($WF_1$ 218→$WF_n$ 220). A dynamically updateable set of one or more WFs ($WF_1$ 218→$WF_n$ 220) remove incoming traffic from an intermediate or temporary IQ ($IQ_1$ 212→$IQ_n$ 216), perform all of the required processing operations, and deposit processed artifacts on an intermediate or temporary OQ ($OQ_1$ 222→$OQ_n$ 226). The WF component will be described more fully below.

4) Outgoing Queues ($OQ_1$ 222→$OQ_n$ 226). A dynamically updateable set of one or more OQs ($OQ_1$ 222→$OQ_n$ 226) operate as intermediate or temporary buffers for outgoing traffic.

5) An Administrator 228. An Administrator 228 provides, possibly inter alia, management or administrative control over all of the different system components (e.g., IQs [$IQ_1$ 212→$IQ_n$ 216], WFs [$WF_1$ 218→$WF_n$ 220], OQs [$OQ_1$ 222→$OQ_n$ 226], etc.), a facility through which configuration information (for, possibly inter alia, one or more system components) may be dynamically updated, etc. An Administrator 228 may provide, as one example, a Web-based interface 230; it will be readily apparent to one of ordinary skill in the relevant art that numerous other interfaces (e.g., a data feed, an Application Programming Interface [API], etc.) are easily possible.

6) In-Memory Databases (In-Memory Database$_1$ 232→In-Memory Database$_n$ 234). A dynamically updateable set of one or more instances of an in-memory database facility (In-Memory Database$_1$ 232→In-Memory Database$_n$ 234) may provide, possibly inter alia, very high performance access to, possibly among other things, (a) a local cache and (b) aspects of the information that is maintained in a Composite Routing Database (CRD) 236.

7) A Real-Time Query Facility (RTQF) 238. When it is necessary to retrieve information about a destination address (e.g., a destination TN) a RTQF 238 may employ any combination of one or more channels such as SS7 240, User Datagram Protocol (UDP)/IP 242, Electronic Numbering (ENUM) 244, Transmission Control Protocol (TCP)/IP 246, etc. to complete such retrievals. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of how such a facility may provide, possibly among other things, support for the authoritative determination of a servicing WC given a TN (a) for any country (i.e., any TN numbering scheme) around the world and (b) that fully accounts for complexities such as Mobile Number Portability (MNP) regimes.

8) A CRD 236. A consolidated repository that maintains, possibly inter alia, raw, processed, etc. authoritative routing data.

It will be readily apparent to one of ordinary skill in the relevant art that numerous other components and/or numerous alternative component arrangements are possible. For example:

1) The different database environments that are depicted in FIG. 2—e.g., the In-Memory Databases (In-Memory Database$_1$ 232→In-Memory Database$_n$ 234) and the CRD 236—are logical representations of the possibly multiple physical repositories that might be implemented. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

2) A Gateway 202 may maintain a repository (e.g., a database) into which selected details of all administrative, processing, etc. activities may be recorded. Among other things, such a repository may be used to support scheduled (e.g., daily, weekly, etc.) and/or on-demand reporting with report results delivered (to, for example, an Entity [$E_1$ 204, $E_2$ 206, . . . $E_n$ 210]) through, possibly inter alia, any combination of one or more channels such as the World Wide Web (WWW via, for example, a dedicated Web site), wireless messaging (SMS, MMS, etc.), Electronic Mail (E-Mail) messages, Instant Messaging (IM), conventional mail, telephone, Interactive Voice Response (IVR) facility, etc.

Through flexible, extensible, and dynamically updatable configuration information a WF component may be quickly and easily realized to support any number of activities. For example, WFs might be configured to support various internal processing steps (please see below); to support the generation and dispatch of response, etc. messages; to support various billing transactions; to support the generation of scheduled and/or on-demand reports; etc. The specific WFs that were just described are exemplary only; it will be readily apparent to one of ordinary skill in the relevant art that numerous other WF arrangements, alternatives, etc. are easily possible.

An illustrative internal processing sequence, that may be realized as a WF, might include the following steps:

1) Retrieve an incoming message from an IQ.

Figure 3:
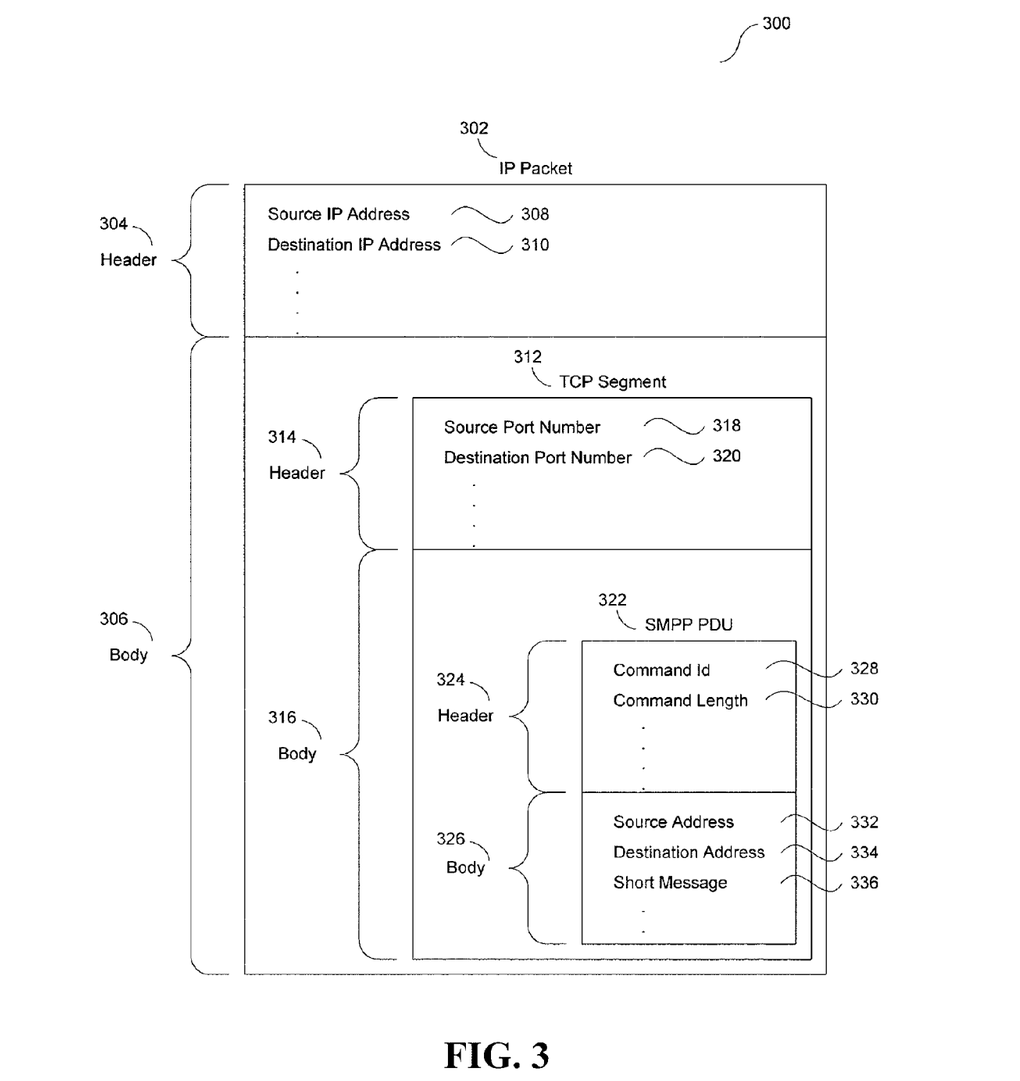
FIG. 3 illustrates an exemplary incoming message transited by an IP.
Figure 5:
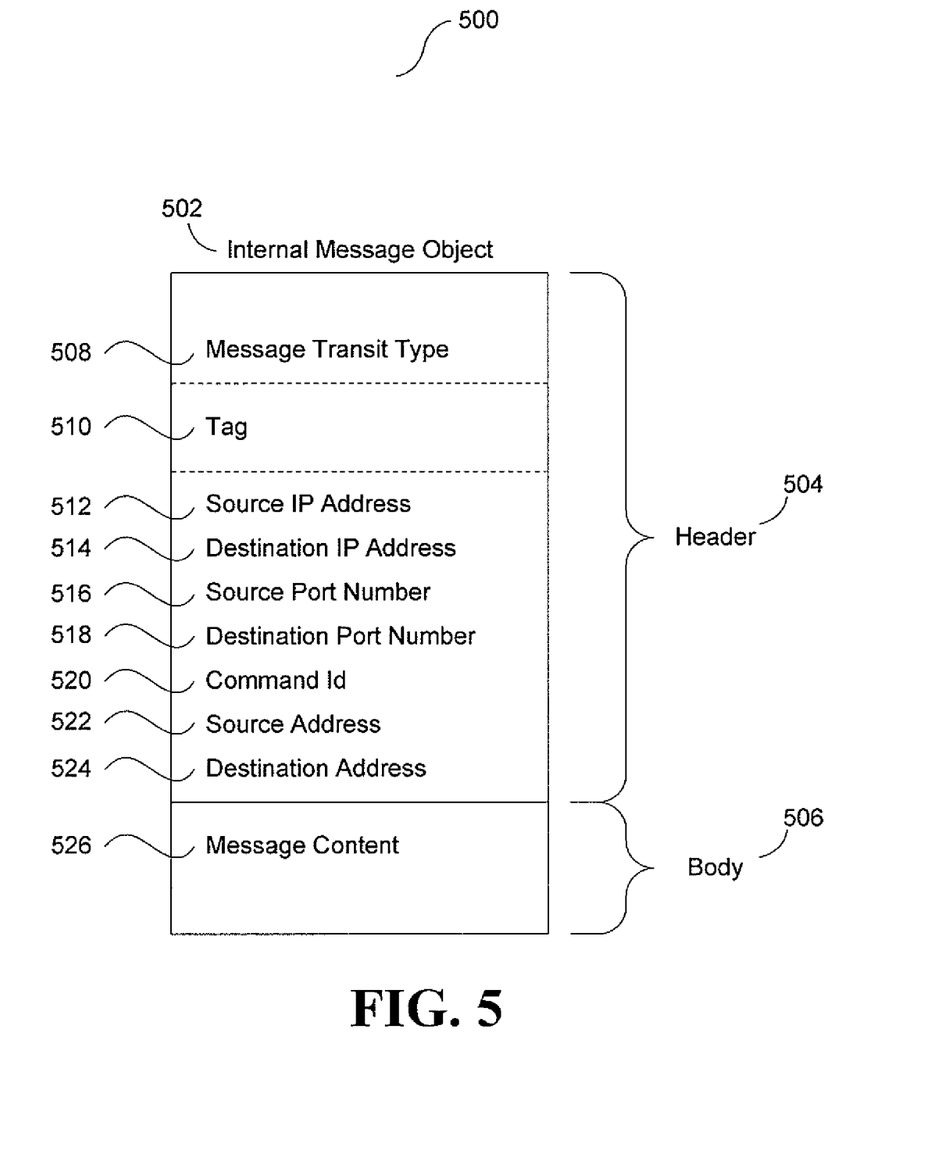
FIG. 5 illustrates a hypothetical Internal Message Object (IMO) that is possible under aspects of the instant invention.

2) Based on a set of flexible, extensible, and dynamically configurable rules extract various data elements from the incoming message and preserve the data elements in an IMO. Such rules will preferably employ, leverage, etc. aspects of Feature Extraction (i.e., means for, possibly inter alia, the flexible extraction and aggregation of data from dynamic content) as taught in U.S. patent application Ser. No. 10/709, 475 and its continuations. For purposes of illustration, consider the following two examples:

A) As illustrated in FIG. 3 and reference numeral 300, an incoming SMS message is received via the Short Message Peer-to-Peer (SMPP) communication paradigm. Using FIG. 5 and reference numeral 500 as one possible scenario, data elements or fields in the IMO 502 are populated with values from the data elements or fields from the incoming IP 302-TCP 312-SMPP 322 message:

| IMO Field | Incoming Message Field |
|---|---|
| Message Transit Type 508 | SMPP over TCP/IP |
| Source IP Address 512 | IP Packet 302 → Source IP Address 308 |
| Destination IP Address 514 | IP Packet 302 → Destination IP Address 310 |
| Source Port Number 516 | IP Packet 302 → TCP Segment 312 → Source Port Number 318 |
| Destination Port Number 518 | IP Packet 302 → TCP Segment 312 → Destination Port Number 320 |
| Command Id 520 | IP Packet 302 → TCP Segment 312 → SMPP PDU 322 → Command Id 328 |
| Source Address 522 | IP Packet 302 → TCP Segment 312 → SMPP PDU 322 → Source Address 332 |
| Destination Address 522 | IP Packet 302 → TCP Segment 312 → SMPP PDU 322 → Destination Address 334 |
| Message Content 524 | IP Packet 302 → TCP Segment 312 → SMPP PDU 322 → Short Message 336 |

Figure 4:
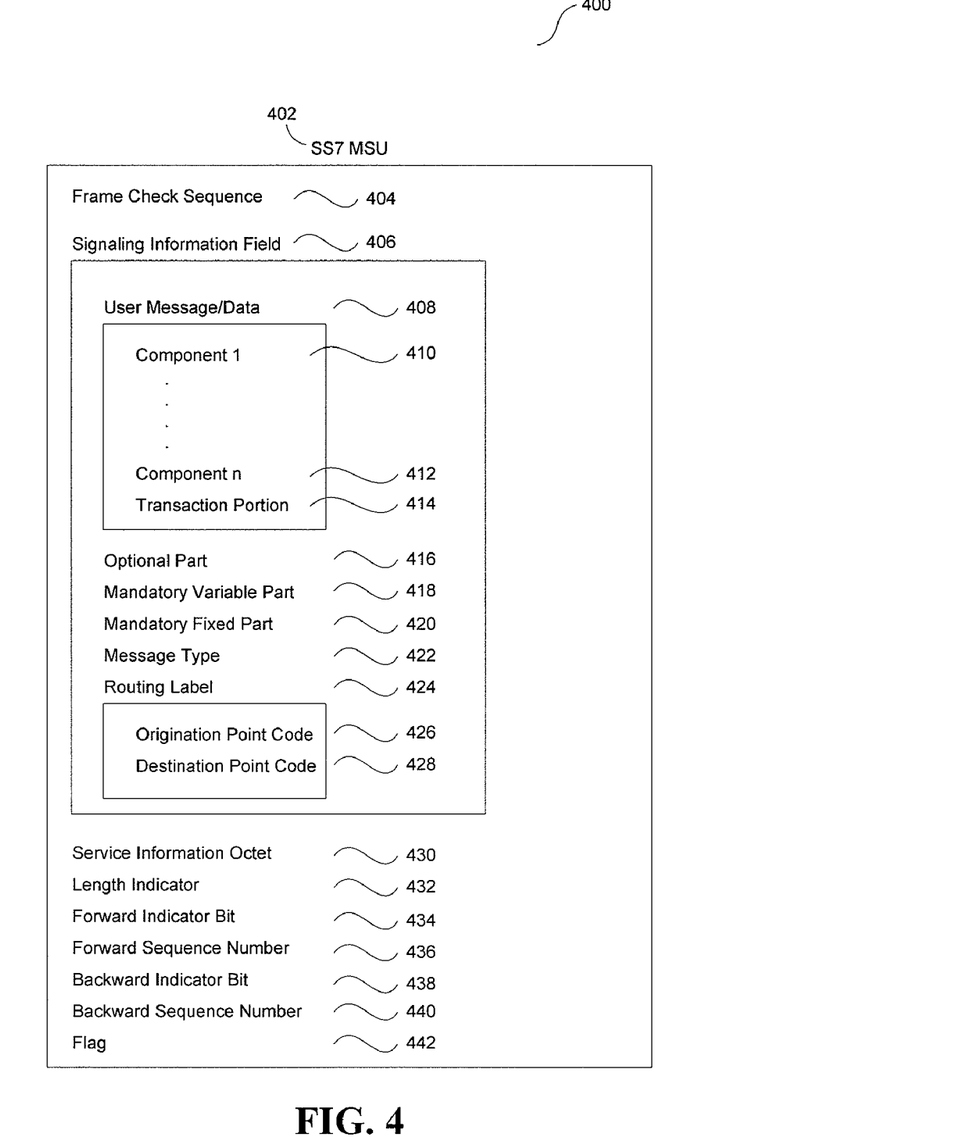
FIG. 4 illustrates an exemplary incoming message transited by Signaling System Number 7 (SS7).
Figure 6:
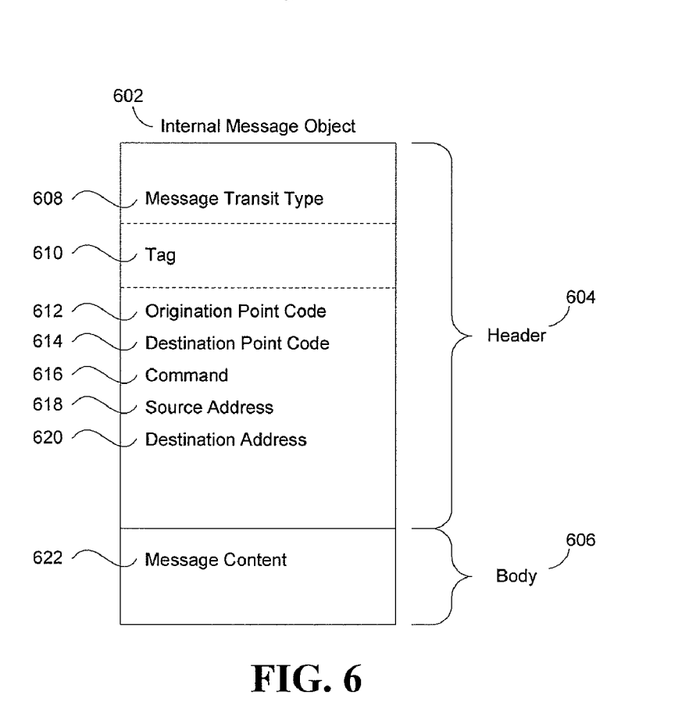
FIG. 6 illustrates a hypothetical IMO that is possible under alternative aspects of the instant invention.

B) As illustrated in FIG. 4 and reference numeral 400, an incoming SMS message is received via SS7. Using FIG. 6 and reference numeral 600 as one possible scenario, data elements or fields in the IMO 602 are populated with values from the data elements or fields from the incoming SS7 Message Signal Unit (MSU) 402:

| IMO Field | Incoming Message Field |
|---|---|
| Message Transit Type 608 | SS7 |
| Origination Point Code 612 | SS7 MSU 402 → Signaling Information Field 406 → Routing Label 424 → Origination Point Code 426 |
| Destination Point Code 614 | SS7 MSU 402 → Signaling Information Field 406 → Routing Label 424 → Destination Point Code 428 |
| Command 616 | SS7 MSU 402 → Signaling Information Field 406 → User Message/Data 408 → * |
| Source Address 618 | SS7 MSU 402 → Signaling Information Field 406 → User Message/Data 408 → * |
| Destination Address 620 | SS7 MSU 402 → Signaling Information Field 406 → User Message/Data 408 → * |
| Message Content 622 | SS7 MSU 402 → Signaling Information Field 406 → User Message/Data 408 → * |

Numerous other examples (dealing with, possibly inter alia, the receipt of other message types [such as, for example, MMS, etc.], the use of other communication paradigms [such as, for example, Computer Interface to Message Distribution Version 2 {CIMD2}, External Machine Interface {EMI}/ Universal Computer Protocol {UCP}, etc.], and the user of other transit protocols [such as, for example, UDP, etc.]) are obviously easily possible.

3) Based on a set of flexible, extensible, and dynamically configurable rules process the IMO. For example, through (possibly inter alia) the CRD resolve the Source Address (to identify, possibly inter alia, a source WC) and/or the Destination Address (to identify, possibly inter alia, a destination WC).

Figure 7:
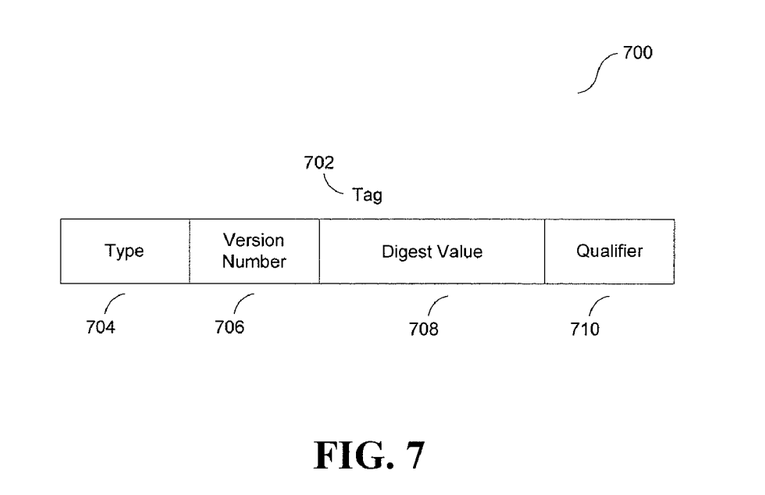
FIG. 7 illustrates a hypothetical Tag value that is possible under aspects of the instant invention.

4) Based on a set of flexible, extensible, and dynamically configurable rules generate a Tag and preserve the Tag within the IMO (i.e., IMO→Tag). For a general description of a Tag see U.S. patent application Ser. No. 10/709,475 and its continuations. As illustrated in FIG. 7 and reference numeral 700, a Tag 702 may contain (possibly inter alia) a Type value 704 (e.g., possibly 'M' for message), a Version Number 706 (e.g., possibly '0') for backwards compatibility, a Digest Value 708 (e.g., possibly the output of a one-way or 'hash' function such as a modified version of MD5 or LOOKUP3), and a Qualifier 710 (e.g., an optional value that ensures the uniqueness of the Tag). It will be readily apparent to one of ordinary skill in the relevant art that numerous other Tag elements and/or numerous alternative Tag element arrangements are easily possible. For purposes of illustration, consider the following two examples:

A) An SMS message is received from a WD with TN 703-555-1234 (that is serviced by WC XYZ) and addressed to the WD with 202-555-9876 (that is serviced by WC ABC). The Digest Value is defined to consist of the source WC (i.e., XYZ) and the destination WC (i.e., ABC). The Tag might consist of:

| Type | Version Number | Digest Value | Qualifier |
|---|---|---|---|
| M | 0 | AF6377Z09 | 0 |

B) An SMS message is received from a WD with TN 703-555-1234 (that is serviced by WC XYZ) and addressed to the WD with 202-555-9876 (that is serviced by WC ABC). The Digest Value is defined to consist of the source WC (i.e., XYZ) and the destination TN (i.e., 202-555-9876). The Tag might consist of:

| Type | Version Number | Digest Value | Qualifier |
|---|---|---|---|
| M | 0 | Z8R28510P | 0 |

Numerous other examples (dealing with, possibly inter alia, different data elements or fields, etc.) are obviously easily possible.

5) Examine the contents of a local cache. For example, a hypothetical local cache might contain:

| Tag Digest Value | Route Selection |
|---|---|
| . | |
| AF6377Z09 | ABC (Delivery Channel #21) |
| . | |
| . | |

It will be readily apparent to one of ordinary skill in the relevant art that numerous other local cache elements and/or numerous alternative local cache element arrangements are easily possible. Does the Digest Value of the instant Tag exist in the local cache? If yes, then retrieve the value of the preserved Route Selection and proceed to Step 7.

6) Using a set of flexible, extensible, and dynamically configurable rules complete a Route Selection process. Such a process may include or consider, possibly inter alia, any number of data elements or fields in an IMO; system configuration information such as defined delivery paths; constraints such as Day of Week (DoW), Time of Day (ToD), etc.; factors such as current system loads and QoS levels; paradigms such as Least Cost Routing (LCR); etc. Such a process may include one or more defined 'hooks' to support, possibly inter alia, various billing events. The generated Route Selection may be preserved by, possibly inter alia, placing it in the local cache (e.g., by associating it with the instant Digest Value), recording it in a Message Detail Record (MDR) repository (e.g., by associating it with the instant Tag value), etc.

7) From the IMO construct an outgoing message and, based on possibly inter alia the Route Selection, deposit the outgoing message on an OQ. Various of the particulars of the outgoing message may be preserved by, possibly inter alia, updating one or more entries in a MDR repository.

The specific processing activities that were described above are illustrative only and it will be readily apparent to one of ordinary skill in the relevant art that numerous other processing activities are easily possible and indeed are fully within the scope of the present invention. For example:

1) The Header and/or Body of an IMO may contain other data elements or fields (over and above what were depicted in FIG. 5 and reference numeral 500 and FIG. 6 and reference numeral 600) including, possibly inter alia, one or more date and time values, data value encoding flags, priority indicators, etc. For example, the IMO that was presented in FIG. 5 and reference numeral 500 contains just one 'Destination IP Address' 514 field. Alternatively, such an IMO might contain multiple 'Destination IP Address' fields—e.g., a 'Initial Destination IP Address' field (that might be populated with, for example, the value of IP Packet→Destination IP Address from an incoming message), one or more 'Intermediate Destination IP Address' fields (that might be populated with, for example, the IP Address of each of the different systems that contribute to the routing and processing of the instant IMO), and a 'Final Destination IP Address' field (that might be populated with, for example, the IP Address of the recipient system of a dispatched outgoing message). In a similar fashion such an IMO might contain multiple 'Destination Port Number' fields—e.g., a 'Initial Destination Port Number' field, one or more 'Intermediate Destination Port Number' fields, and a 'Final Destination Port Number' field. In like fashion, in the case of the SS7-based IMO that is presented in FIG. 6 and reference numeral 600 multiple 'Destination Point Code' 614 fields might be defined.

2) As noted above, numerous other Tag elements and/or numerous alternative Tag element arrangements are easily possible. Additionally, a Tag's Digest Value may be defined to consist of any combination of a number of items—e.g., a destination WC and a QoS level; a destination WC and a DoW indicator and a ToD indicator; etc.

3) A MDR repository may preserve a wide range of information for each message that is processed (including, for example, IMO data elements or fields such as Tag value, source and destination address [TN, Short Code, etc.], date and time, etc.; portions of constructed outgoing messages; etc.) and may, as one possible example, be keyed or indexed by Tag value.

4) Numerous alternative supporting facilities are easily possible within a MPI. For example, a Service ID might be defined to encompass, possibly inter alia, a particular class of messaging for a specific WC (e.g., 'Standard SMS messaging from Carrier XYZ', 'Standard SMS messaging to Carrier XYZ', etc.); a repository of Service IDs that are defined/configured/etc. within an infrastructure might be maintained; and Service ID might be included [a] as a data element or field within an IMO, [b] as a Tag element, [c] within the flexible, extensible, and dynamically configurable rules, [d] etc. As another example, a Destination ID might be defined to encompass, possibly inter alia, a particular message transit channel for a specific WC (e.g., 'Message channel 819 from Carrier ABC', 'Message channel 237 to Carrier ABC', etc.); a repository of Destination IDs that are defined/configured/ etc. within an infrastructure might be maintained; and Destination ID might be included [a] as a data element or field within an IMO, [b] as a Tag element, [c] within the flexible, extensible, and dynamically configurable rules, [d] etc. Numerous other supporting facilities are obviously easily possible. It will be readily apparent to one of ordinary skill in the relevant art that such supporting facilities may, possibly inter alia, be combined in any number of ways—e.g., a Service ID might subsume one or more Destination IDs; a Tag's Digest Value might be defined to include Service ID and Destination ID; etc.

The processing activities that were described above may be implemented through, and consequently supported by, any combination of a number of technologies, etc. For example:

1) An IMO may be implemented through any combination of a number of facilities including, possibly inter alia, flat files, in-memory data structures, etc. For example, within a Java Message Service (JMS) environment an IMO might be implemented as a JMS message with, possibly inter alia, the different data elements or fields that were described above realized as individual JMS message properties.

2) The flexible, extensible, and dynamically configurable rules that were described above (e.g., for data element extraction, for IMO processing, for Tag generation, for Route Selection processing, etc.) may be implemented through any combination of a number of facilities including, possibly alia, conventional programming constructs (such as, for example, C, Java, C++, Perl, etc.), regular expressions, custom or proprietary solutions, etc.

The advantages, benefits, etc. of the message routing model that has been described above include, possibly inter alia:

1) Performance. For example, subsequent Route Selection retrievals from a local cache may be completed very quickly. This benefit is particularly valuable in a Peer-to-Peer (P2P) messaging environment where there is traditionally a 'balance of trade'—i.e., if $MS_1$ sends a message to $MS_2$ then it is likely that $MS_2$ will reply to $MS_1$, after which $MS_1$ will likely send another message to $MS_2$ and $MS_2$ will again reply, after which etc.

2) Value-add services. For example, as noted previously a Gateway may maintain a repository (e.g., a database) into which selected details of all administrative, processing, etc. activities may be recorded to support the subsequent generation of scheduled (e.g., daily, weekly, etc.) and/or on-demand reports. Additionally, aspects of the present invention (including, possibly inter alia, the extraction of data elements from an incoming message, the processing of an IMO, the generation of a Tag value, etc.) may support enhanced troubleshooting, problem investigation, etc. capabilities (through, possibly inter alia, the preservation and exposure of a plethora of data elements) and those capabilities may, as just one example, be associated with different offered QoS levels (and possible charges for same—e.g., one may pay more for the faster, etc. routing of a message and pay less for the slower, etc. routing of a message).

3) Flexibility and extensibility. For example, dynamically configurable sets of rules (for, as an example, the extraction of data elements from an incoming message, the processing of an IMO, the generation of a Tag value, etc.) contribute significantly to a responsive, open, etc. MPI.

During the processing steps that were described above one or more billing transactions may optionally be completed—e.g., for each request that is received, for various of the processing steps that are performed, for each response returned, etc. A billing transaction may take any number of forms and may involve different external entities (e.g., a WC's billing system, a carrier billing system service bureau, a credit or debit card clearinghouse, etc.). A billing transaction may include, possibly inter alia:

1) The appearance of a line item charge on the bill or statement that, for example, an Entity may receive from their WC. Exemplary mechanics and logistics associated with this approach are described in pending U.S. patent application Ser. No. 10/837,695 entitled "SYSTEM AND METHOD FOR BILLING AUGMENTATION." Other ways of completing or performing line item billing are easily implemented by those skilled in the art.

2) The charging of a credit card or the debiting of a debit card.

3) The charging of an internal account.

The report, etc. messages that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current pysical location of the recipient of the message as derived from, as one example, a Location-Based Service [LBS] facility).

The report, etc. messages may optionally contain advertising—e.g., textual material if a simple channel is being utilized, or multimedia (images of brand logos, sound, video snippets, etc.) material if a more capable channel is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

The report, etc. messages may optionally contain promotional materials (e.g., still images, video clips, etc.).

The discussion that was just presented referenced two specific wireless messaging paradigms—SMS and MMS. These paradigms potentially offer an incremental advantage over other paradigms; for example, native support for SMS and MMS is commonly found on a WD that a potential MS would be carrying. However, it is to be understood that it would be readily apparent to one of ordinary skill in the relevant art that numerous other paradigms (such as, possibly inter alia, IMS, etc.) are fully within the scope of the present invention.

The foregoing disclosure of the preferred embodiments of the present invention has been presented for purposes of illustration and description. It is not intended to be exhaustive or to limit the invention to the precise forms disclosed. It will be readily apparent to one of ordinary skill in the relevant art that numerous alternatives to the presented embodiments are easily possible and, indeed, are fully within the scope of the present invention.

The following list defines acronyms as used in this disclosure.

| Acronym | Meaning |
| --- | --- |
| API | Application Programming Interface |
| CIMD2 | Computer Interface to Machine Distribution (Version 2) |
| CP | Content Provider |
| CRD | Composite Routing Database |
| DBMS | Database Management System |
| DoW | Day of Week |
| E-Mail | Electronic Mail |
| EMI | External Machine Interface |
| ENUM | Electronic Numbering |
| IM | Instant Messaging |
| IMO | Internal Message Object |
| IMS | IP Multimedia Subsystem |
| IP | Internet Protocol |
| IQ | Incoming Queue |
| IVR | Interactive Voice Response |
| JMS | Java Message Service |
| LBS | Location-Based Service |
| LCR | Least Cost Routing |
| MDR | Message Detail Repository |
| MICV | Messaging Inter-Carrier Vendor |
| MMS | Multimedia Message Service |
| MNP | Mobile Number Portability |
| MPI | Message Processing Infrastructure |
| MS | Mobile Subscriber |
| MSU | Message Signal Unit |
| ODBMS | Object Database Management System |
| OQ | Outgoing Queue |
| P2P | Peer-to-Peer |
| QoS | Quality of Service |
| RDBMS | Relational Database Management System |

-continued

| Acronym | Meaning |
|---|---|
| RTQF | Real-Time Query Facility |
| SMS | Short Message Service |
| SMPP | Short Message Peer-to-Peer |
| SP | Service Provider |
| SS7 | Signaling System Number 7 |
| TCP | Transmission Control Protocol |
| TN | Telephone Number |
| ToD | Time of Day |
| UCP | Universal Computer Protocol |
| UDP | User Datagram Protocol |
| WC | Wireless Carrier |
| WD | Wireless Device |
| WF | WorkFlow |
| WWW | World Wide Web |

What is claimed is:

1. A method for routing a wireless message, comprising:
receiving at a gateway an incoming message, said incoming message containing at least a destination address and having been originally initiated as a wireless message including said destination address;
performing one or more processing steps on said incoming message including at least:
(a) resolving said destination address yielding a resolved destination address;
(b) generating a tag, said tag containing at least a digest value, said digest value being generated by passing at least one or more of aspects of said destination address through a one-way function;
querying a local cache for the presence of said digest value, said local cache preserving for a digest value at least a route selection;
generating an outgoing message, said outgoing message being based on at least said route selection and aspects of said incoming message; and
dispatching said outgoing message.

2. The method of claim 1, wherein said wireless message is one of (a) a Short Message Service message, (b) a Multimedia Message Service message, or (c) an IP Multimedia Subsystem message.

3. The method of claim 1, wherein said destination address is one of (a) a telephone number, (b) a short code, (c) a SIP address, or (d) an e-mail address.

4. The method of claim 1, wherein resolving said destination address comprises accessing one or more of (a) a composite routing database and (b) a real-time query facility.

5. The method of claim 1, wherein said tag contains one or more of (a) a type indicator, (b) a version number, (c) a digest value, and (d) a qualifier.

6. The method of claim 1, wherein the outgoing message is configured such that it can be sent as one of (a) a Short Message Service message, (b) a Multimedia Message Service message, or (c) an IP Multimedia Subsystem message.

7. The method of claim 1, further comprising:
preserving aspects of the addressing of said incoming message as preserved address elements.

8. The method of claim 7, wherein said preserved address elements include one or both of (a) source address information and (b) destination address information.

9. The method of claim 7, wherein said preserved address elements include one or more of (a) an Internet Protocol address, (b) a Transmission Control Protocol port number, and (c) a User Datagram Protocol port number when said incoming message is received through an Internet Protocol-based communication paradigm.

10. The method of claim 7, wherein said preserved address elements include one or more of (a) a point code and (b) a subsystem number when said incoming message is received through a Signaling System Number 7-based communication paradigm.

11. A method for routing wireless messages, comprising:
receiving at a gateway an incoming message, said incoming message containing at least a destination address and having been originally initiated as a wireless message;
extracting one or more data elements from said incoming message yielding extracted data elements;
preserving one or more extracted data elements in an internal message object;
performing one or more processing steps on said internal message object including at least:
(a) resolving said destination address yielding a resolved destination address;
(b) generating a tag, said tag being preserved in said internal message object and said tag containing at least a digest value, said digest value being generated by passing at least one or more of aspects of said destination address through a one-way function;
querying a local cache for the presence of said digest value, said local cache preserving for said digest value at least a route selection, said route selection being preserved in said internal message object;
generating an outgoing message based on aspects of said internal message object; and
dispatching said outgoing message.

12. The method of claim 11, wherein said wireless message is one of (a) a Short Message Service message, (b) a Multimedia Message Service message, or (c) an IP Multimedia Subsystem message.

13. The method of claim 11, wherein said destination address is one of (a) a telephone number, (b) a short code, (c) a SIP address, or (d) an e-mail address.

14. The method of claim 11, wherein said internal message object includes one or more of at least (a) a header and (b) a body.

15. The method of claim 11, wherein resolving said destination address comprises accessing one or more of (a) a composite routing database and (b) a real-time query facility.

16. The method of claim 11, wherein said tag contains one or more of (a) a type indicator, (b) a version number, (c) a digest value, and (d) a qualifier.

17. The method of claim 11, wherein said outgoing message is configured such that it can be sent as one of (a) a Short Message Service message, (b) a Multimedia Message Service message, or (c) an IP Multimedia Subsystem message.

18. A system for routing a wireless message, comprising:
a gateway at which an incoming message is received, said incoming message having been initiated as a wireless message that contains at least a destination address; and
at least one workflow module, said at least one workflow module operable to:
(a) resolve said destination address yielding a resolved destination address;
(b) generate a tag, said tag containing at least a digest value, said digest value being generated by passing at least one or more of aspects of said destination address through a one-way function;
(c) query a local cache for the presence of said digest value, said local cache preserving for a digest value at least a route selection; and
(d) generate an outgoing message, said outgoing message being based on at least said route selection and aspects of said incoming wireless message.

19. The system of claim 18, wherein said wireless message is one of (a) a Short Message Service message, (b) a Multimedia Message Service message, or (c) an IP Multimedia Subsystem message.

20. The system of claim 18, wherein said destination address is one of (a) a telephone number, (b) a short code, (c) a SIP address, or (d) an e-mail address.

21. The system of claim 18, wherein the at least one workflow module is operable to develop a route selection for a given destination address when a digest value is absent from the cache.

22. The system of claim 18, wherein to resolve said destination address comprises accessing one or more of (a) a composite routing database and (b) a real-time query facility.

23. The system of claim 18, wherein said tag contains one or more of (a) a type indicator, (b) a version number, (c) a digest value, and (d) a qualifier.

24. The system of claim 18, wherein said outgoing message is configured such that it can be sent as one of (a) a Short Message Service message, (b) a Multimedia Message Service message, or (c) an IP Multimedia Subsystem message.

25. The system of claim 18, wherein the at least one workflow module preserves aspects of the addressing of said incoming message as preserved address elements.

26. The system of claim 25, wherein said preserved address elements include one or both of (a) source address information and (b) destination address information.

27. The system of claim 25, wherein said preserved address elements include one or more of (a) an Internet Protocol address, (b) a Transmission Control Protocol port number, and (c) a User Datagram Protocol port number when said incoming message is received through an Internet Protocol-based communication paradigm.

28. The system of claim 25, wherein said preserved address elements include one or more of (a) a point code and (b) a subsystem number when said incoming message is received through a Signaling System Number 7-based communication paradigm.

29. A system for routing wireless messages, comprising:
  a gateway at which an incoming message is received, said incoming message containing at least a destination address, said incoming message having been originally initiated as a wireless message; and
  workflow modules, said workflow modules being operable to:
  (a) extract one or more data elements from said incoming message yielding extracted data elements;
  (b) preserve one or more extracted data elements in an internal message object;
  (c) resolve said destination address yielding a resolved destination address;
  (d) generate a tag, said tag being preserved in said internal message object and said tag containing at least a digest value, said digest value being generated by passing at least one or more aspects of said destination address through a one-way function;
  (e) query a local cache for the presence of said digest value, said local cache preserving for a digest value at least a route selection said route selection being preserved in said internal message object; and
  (f) generate an outgoing message, said outgoing message being based on aspects of said internal message object.

30. The system of claim 29, wherein the wireless message is one of (a) a Short Message Service message, (b) a Multimedia Message Service message, or (c) an IP Multimedia Subsystem message.

31. The system of claim 29, wherein the destination address is one of (a) a telephone number, (b) a short code, (c) a SIP address, or (d) an e-mail address.

32. The system of claim 29, wherein the workflow modules are controllable with dynamically configurable rules.

33. The system of claim 29, wherein to resolve the destination address at least one of the workflow modules accesses one or more of (a) a composite routing database and (b) a real-time query facility.

34. The system of claim 29, wherein said tag contains one or more of (a) a type indicator, (b) a version number, (c) a digest value, and (d) a qualifier.

35. The system of claim 29, wherein the outgoing message is configured such that it can be sent as one of (a) a Short Message Service message, (b) a Multimedia Message Service message, or (c) an IP Multimedia Subsystem message.

\* \* \* \* \*